United States Patent
Aoyama et al.

(10) Patent No.: US 8,497,321 B2
(45) Date of Patent: Jul. 30, 2013

(54) TACKY RESIN COMPOSITION AND PRESSURE-SENSITIVE ADHESIVE FILM OR SHEET

(75) Inventors: Masataka Aoyama, Ichihara (JP); Yoshitaka Hironaka, Ichihara (JP); Hisao Gonohe, Ichihara (JP)

(73) Assignee: Du Pont-Mitsui Polychemicals Co., Ltd., Tokyo (JP)

( * ) Notice: Subject to any disclaimer, the term of this patent is extended or adjusted under 35 U.S.C. 154(b) by 187 days.

(21) Appl. No.: 12/866,106

(22) PCT Filed: Jan. 28, 2009

(86) PCT No.: PCT/JP2009/051313
§ 371 (c)(1),
(2), (4) Date: Aug. 4, 2010

(87) PCT Pub. No.: WO2009/098976
PCT Pub. Date: Aug. 13, 2009

(65) Prior Publication Data
US 2010/0317802 A1    Dec. 16, 2010

(30) Foreign Application Priority Data

Feb. 5, 2008 (JP) ................................. 2008-025191
Jul. 28, 2008 (JP) ................................. 2008-193520

(51) Int. Cl.
C08L 23/08 (2006.01)
C09J 123/00 (2006.01)
C09J 133/00 (2006.01)
C09J 125/04 (2006.01)

(52) U.S. Cl.
USPC .................................. 525/93; 525/95; 525/98

(58) Field of Classification Search
USPC ............................................... 525/93, 95, 98
See application file for complete search history.

(56) References Cited

U.S. PATENT DOCUMENTS

| | | | | |
|---|---|---|---|---|
| 3,960,823 | A | * | 6/1976 | Komai et al. ................. 526/237 |
| 5,548,027 | A | * | 8/1996 | Heucher et al. ............... 525/179 |
| 2005/0054780 | A1 | * | 3/2005 | Zhou et al. .................... 525/240 |
| 2007/0054118 | A1 | * | 3/2007 | Tabata et al. ............. 428/355 R |

FOREIGN PATENT DOCUMENTS

| | | |
|---|---|---|
| JP | 58-134172 | 8/1983 |
| JP | 62-103141 | 5/1987 |
| JP | 63-216737 | 9/1988 |
| JP | 64-48842 | 2/1989 |
| JP | 07-278383 | 10/1995 |
| JP | 08-170056 | 7/1996 |
| JP | 2000-344989 | 12/2000 |
| JP | 2002-226814 | 8/2002 |
| JP | 2005-281328 | 10/2005 |
| JP | 2006-315385 | 11/2006 |
| JP | 2007-320979 | 12/2007 |
| JP | 2008-297391 | 12/2008 |
| WO | 2005/026282 | 3/2005 |

OTHER PUBLICATIONS

Supplementary European Search Report dated Jun. 22, 2011.

* cited by examiner

*Primary Examiner* — Jeffrey Mullis
(74) *Attorney, Agent, or Firm* — Rankin, Hill & Clark LLP

(57) ABSTRACT

A tacky resin composition which has proper initial tackiness, is sufficiently inhibited from rising in tackiness with time, can keep tackiness at a proper range even when it receives a slight heat history or is stored for a long time, has very small dependence on peeling speed, and can provide high transparency to a pressure-sensitive adhesive film or sheet as required, and a pressure-sensitive adhesive film or sheet for the surface protection of an article, which is obtained form the tacky resin composition. The tacky resin composition comprises (A) 5 to 80 parts by weight of an olefin polymer (component A), (B) 5 to 80 parts by weight of an ethylene/unsaturated ester copolymer (component B) and (C) 1 to 60 parts by weight of a styrene-based elastomer and/or an olefin-based elastomer (component C) based on 100 parts by weight of the total of the components A, B and C.

20 Claims, No Drawings

TACKY RESIN COMPOSITION AND PRESSURE-SENSITIVE ADHESIVE FILM OR SHEET

TECHNICAL FIELD

The present invention relates to a tacky resin composition and a pressure-sensitive adhesive film or sheet obtained from the composition. More specifically, it relates to a tacky resin composition which has proper initial tackiness, is further inhibited from rising in tackiness with time, and can retain constant appropriate tackiness for a long time and has small dependence on peeling speed and to a pressure-sensitive adhesive film or sheet obtained from the composition, particularly a pressure-sensitive adhesive film or sheet preferably used for the surface protection of an article.

DESCRIPTION OF THE PRIOR ART

A pressure-sensitive adhesive film or sheet has been widely used as a surface protection film for protecting the surface of a product such as a synthetic resin board, a decorative laminate, a metal sheet or a coated steel sheet from the adhesion of dust, dirt or a scratch, as a film for the surface protection of a windowpane, as a surface protection film used when an automobile is finished by baking or a printed circuit board is immersed in solder and further as a surface protection film for precision electronic parts such as a liquid crystal panel board, reflecting plate, phase difference plate, prism sheet, light guiding plate, polarizing plate, plasma display panel board, organic fluorescent thin film and transparent electrode, all of which are constituent members of a plasma display or an organic thin film EL apparatus.

In general, it is desired that the pressure-sensitive adhesive film or sheet should have strong adhesion between a base layer and a pressure-sensitive adhesive layer, should be free from self-peeling or fall-off by a slight vibration or impact between the surface of an adherend and a pressure-sensitive adhesive layer and should retain proper adhesive strength between the above surfaces so that it can be smoothly removed without leaving a tacky substance on the surface of the adherend at the time of opening or peeling.

An ethylene/unsaturated ester copolymer such as an ethylene/vinyl acetate copolymer has often been used in the pressure-sensitive adhesive layer of the above film or sheet.

For example, patent document 1 disclose a surface protection film which comprises a pressure-sensitive adhesive layer made of an ethylene/vinyl acetate copolymer having a vinyl acetate content of 18 to 26% on one side of a base layer made of high-density polyethylene.

The ethylene/unsaturated ester copolymer such as an ethylene/vinyl acetate copolymer or ethylene/(meth)acrylate copolymer generally has high initial tackiness (adhesive force) to an adherend.

However, it has a disadvantage that its tackiness rises with time. Especially when it is carried or stored while it is adhered to an adherend at normal temperature and also receives various heat histories, its tackiness rises remarkably with the result that a problem often occurs due to too high tackiness when it is used or removed.

Measures for the suppression of a rise in the adhesive force of the ethylene/vinyl acetate copolymer with time have already been proposed. For example, patent document 2 proposes use of a resin composition prepared by mixing an ethylene/vinyl acetate copolymer with a substantially amorphous propylene-based resin as a tacky resin.

Although a rise in the tackiness of the above resin composition with time can be suppressed to a considerable degree as compared with a conventional product and a certain measure of effect is observed, its improving effect is still unsatisfactory and further improvement has been desired from the industry in this field.

Further, since the initial tackiness of the resin composition is a little high and a rise in tackiness with time cannot be suppressed completely, its tackiness is too high in a certain application field and its use may be limited.

Transparency has recently been required for pressure-sensitive adhesive films and sheets for surface protection in many cases, and demand for pressure-sensitive adhesive films and sheets which meet this requirement is growing.

Patent Document 1: JP-A 1996-170056
Patent Document 2: JP-A 2002-226814

DISCLOSURE OF THE INVENTION

Problems to be Solved by the Invention

The inventors of the present invention have conducted intensive studies to obtain a tacky composition which has proper initial tackiness, is sufficiently inhibited from rising in tackiness with time, can keep appropriate tackiness almost constant even when it receives a slight heat history or is stored for a long time, and can provide high transparency to a pressure-sensitive adhesive film or sheet as required.

As a result, unexpectedly, they have found that a resin composition prepared by mixing a crystalline olefin polymer and a styrene-based elastomer and/or an olefin-based elastomer with an ethylene/unsaturated ester copolymer in a specific ratio meets the above requirement. The present invention has been accomplished based on this finding.

Therefore, it is an object of the present invention to provide a tacky resin composition which has initial tackiness (initial adhesive force) in a proper range and is sufficiently inhibited from rising in tackiness (adhesive force) with time.

It is another object of the present invention to provide a tacky resin composition which can provide an pressure-sensitive adhesive film or sheet having high practical utility.

It is still another object of the present invention to provide a pressure-sensitive adhesive film or sheet obtained from the above tacky resin composition, especially a pressure-sensitive adhesive film or sheet which is preferably used to protect the surface of an article.

Means for Solving the Problems

According to the present invention, there are provided the following tacky resin composition and a pressure-sensitive adhesive film or sheet obtained therefrom.

(1) A tacky resin composition comprising (A) 5 to 80 parts by weight of an olefin polymer (component A), (B) 5 to 80 parts by weight of an ethylene/unsaturated ester copolymer (component B) and (C) 1 to 60 parts by weight of a styrene-based elastomer and/or an olefin-based elastomer (component C) based on 100 parts by weight of the total of the components A, B and C.

(2) The tacky resin composition according to the above paragraph (1), wherein (A) the content of the olefin polymer (component A) is 7.5 to 75 parts by weight, (B) the content of the ethylene/unsaturated ester copolymer (component B) is 7.5 to 75 parts by weight, and (C) the content of the styrene-based elastomer and/or the olefin-based elastomer (component C) is 1 to 49 parts by weight based on 100 parts by weight of the total of the components A, B and C.

(3) The tacky resin composition according to the above paragraph (1) or (2), wherein the component A is a propylene-based (co)polymer having a melting point of 130° C. or higher.
(4) The tacky resin composition according to the above paragraph (1) or (2), wherein the component A is an ethylene-based (co)polymer having a density of 896 to 965 kg/m$^3$.
(5) The tacky resin composition according to any one of the above paragraphs (1) to (4), wherein the component C is a styrene-based elastomer.
(6) The tacky resin composition according to the above paragraph (5), wherein the styrene-based elastomer is a styrene-ethylene/butene-styrene block copolymer (SEBS) which is a hydrogenated product of a styrene-butadiene-styrene block copolymer (SBS) or a styrene-ethylene/propylene-styrene block copolymer (SEPS) which is a hydrogenated product of a styrene-isoprene-styrene block copolymer (SIS).
(7) The tacky resin composition according to any one of the above paragraphs (1) to (6) which further comprises a tackifier.
(8) Use of the tacky resin composition of any one of the above paragraphs (1) to (7) as an adhesive.
(9) A pressure-sensitive adhesive film or sheet comprising a pressure-sensitive adhesive layer formed from the tacky resin composition of any one of the above paragraphs (1) to (7).
(10) A pressure-sensitive adhesive film or sheet which comprises a pressure-sensitive adhesive layer formed from the tacky resin composition of any one of the above paragraphs (1) to (7) and has small dependence on peeling speed of adhesion/peel strength.
(11) A pressure-sensitive adhesive film or sheet having a pressure-sensitive adhesive layer formed from the tacky resin composition of any one of the above paragraphs (1) to (7) on at least one side of a base layer.
(12) The pressure-sensitive adhesive film or sheet according to the above paragraph (11), wherein the base layer is a film or sheet made of an ethylene-based polymer or a propylene-based polymer.
(13) A surface protection film or sheet which is the film or sheet of the above paragraph (11) or (12).
(14) Use of the pressure-sensitive adhesive film or sheet of any one of the above paragraphs (9) to (13) for the surface protection of an article.

Effects of the Invention

Since the tacky resin composition of the present invention is prepared by mixing together specific amounts of a polyolefin polymer and a styrene-based elastomer and/or an olefin-based elastomer with an ethylene/unsaturated ester copolymer, the initial tackiness (adhesive force) of the tacky resin composition falls within a proper range (specifically, 0.5 to 500 g/25 mm), is sufficiently inhibited from rising in tackiness (adhesive force) with time (preferred tackiness increase rate of 50% or less), and can keep its tackiness at a proper range even when it receives a slight heat history or is stored for a long time. In addition, a rise in the tackiness of the tacky resin composition of the present invention is completely suppressed even when the stripping speed for stripping a film made of the tacky resin composition from the adherend is increased.

Further, high transparency can be provided to the pressure-sensitive adhesive film or sheet as required.

Therefore, the pressure-sensitive adhesive film or sheet obtained from the tacky resin composition of the present invention is advantageously used as a film or sheet for the surface protection of a product such as a synthetic resin board, a decorative laminate, a metal sheet or a coated steel sheet from the adhesion of dust, dirt or a scratch, for the surface protection of a windowpane, for surface protection when an automobile is finished by baking or a printed circuit board is immersed in solder and further for the surface protection of precision electronic parts such as a liquid crystal panel board, reflecting plate, phase difference plate, prism sheet, light guiding plate, polarizing plate, plasma display panel board, organic fluorescent thin film and transparent electrode, all of which are constituent members of a plasma display or an organic thin film EL apparatus.

BEST MODE FOR CARRYING OUT THE INVENTION

A preferred embodiment of the present invention will be described in detail and concrete terms hereinunder.

As already described above, the tacky resin composition of the present invention comprises an olefin polymer (component A), an ethylene/unsaturated ester copolymer (component B) and a styrene-based elastomer and/or an olefin-based elastomer (component C) as essential components. A description is first given of each of the above components.

<Component A (Olefin Polymer)>

In the present invention, examples of the olefin polymer (the olefin polymer means an olefin homopolymer or an olefin copolymer in the present invention) as the component A include propylene-based (co)polymers, ethylene-based (co)polymers such as crystalline high-density polyethylene, medium-density and low-density polyethylenes, and linear low-density polyethylene (LLDPE) polymerized by a metallocene catalyst, and polyolefins having 1 to 12 carbon atoms such as polybutene, poly(4-methyl-1-pentene), polyhexene and polyoctene. In the present invention, out of these, crystalline olefin polymers are preferred, and propylene-based (co)polymers are particularly preferred.

In the present invention, the term "propylene-based (co)polymer" means a propylene homopolymer or a copolymer of propylene containing not less than 50 mol % of a propylene component and another monomer.

As the propylene-based (co)polymer, a propylene-based (co)polymer having a high melting point of 130° C. or higher, especially a crystalline propylene-based (co)polymer having a high melting point of 130° C. or higher is particularly preferably used in the present invention.

A typical example of the crystalline propylene-based (co)polymer having a high melting point is a stereospecific polymer such as highly crystalline isotactic polypropylene.

The propylene-based (co)polymer used in the present invention is a crystalline propylene homopolymer (polypropylene homopolymer) having a melting point (melting peak temperature based on JIS K7121) of 130° C. or higher, or a random copolymer or block copolymer comprising propylene as the main component, more specifically a random copolymer or block copolymer comprising not less than 50 mol %, preferably not less than 80 mol % of a propylene component and less than 50 mol %, specifically not more than 20 mol % of another monomer component except for propylene.

Examples of the another monomer component include α-olefins having preferably 2 or 4 to 20 carbon atoms, particularly preferably 2 or 4 to 8 carbon atoms such as ethylene, 1-butene, 1-pentene, 1-hexene, 1-octene, 1-decene, 1-dodecene, 1-tetradecene and 1-octadecene.

In the present invention, out of the above propylene (co) polymers, a propylene (co)polymer having a latent heat quantity (melting heat quantity) obtained from a heat absorption peak at a melting point measured by a differential scanning calorimeter (DSC) (measured based on JIS K7122) of preferably 10 to 120 J/g, particularly preferably 30 to 110 J/g is preferred. When the above propylene (co)polymer is a propylene copolymer, a random copolymer is more preferred.

The melt flow rate (MFR) (based on JIS K7210-99, 230° C., load of 2160 g) of the above propylene (co)polymer is preferably 1 to 60 g/10 min, particularly preferably 2 to 30 g/10 min.

In the present invention, another preferred component A is an ethylene-based (co)polymer. The ethylene-based (co) polymer is preferably an ethylene-based (co)polymer having a density of 896 to 965 kg/m$^3$, particularly preferably a crystalline ethylene-based (co)polymer having a density of 896 to 965 kg/m$^3$. The term "ethylene-based (co)polymer" as used in the present invention means an ethylene homopolymer or a copolymer of ethylene containing not less than 50 mol % of an ethylene component and another monomer (excluding the component B which will be described hereinafter). The another monomer is preferably an $\alpha$-olefin except for ethylene, particularly preferably an $\alpha$-olefin having 3 to 12 carbon atoms. The density of the ethylene-based (co)polymer is dominated almost by its polymerization process, and the above ethylene-based (co)polymer is produced mainly by a high-pressure process (1,500 to 3,000 atm.), an intermediate-pressure process (30 to 70 atm., Phillips process or standard process), a low-pressure process (normal pressure or slightly increased pressure; Ziegler process) or a low-pressure process using a metallocene catalyst.

The melt flow rate (MFR) (based on JIS K7210-99, 190° C., load of 2160 kg) of the ethylene-based (co)polymer is preferably 0.5 to 20 g/10 min, particularly preferably 1 to 15 g/10 min.

The component A in the present invention is preferably the above crystalline propylene-based (co)polymer or ethylene-based (co)polymer, more preferably the former (crystalline propylene-based (co)polymer). A mixture of these may also be used.

<Ethylene/Unsaturated Ester Copolymer (Component B)>

The ethylene/unsaturated ester copolymer (component B) used as another essential component in the present invention is, for example, a copolymer of ethylene and a vinyl ester such as vinyl acetate or vinyl propionate, or a copolymer of ethylene and an alkyl ester having up to 20 carbon atoms of an unsaturated carboxylic acid such as acrylic acid, methacrylic acid, maleic acid, maleic anhydride, fumaric acid, itaconic acid or itaconic anhydride. More specifically, it is a copolymer of ethylene and an unsaturated carboxylate such as methyl acrylate, ethyl acrylate, isopropyl acrylate, n-propyl acrylate, isobutyl acrylate, n-butyl acrylate, 2-ethylhexyl acrylate, methyl methacrylate, ethyl methacrylate, isobutyl methacrylate, n-butyl methacrylate, glycidyl methacrylate, dimethyl maleate or diethyl maleate.

Further, it may be a multi-element copolymer obtained by copolymerizing ethylene with two or more of the above unsaturated esters, besides the above two-element copolymer. As long as the characteristic properties such as flexibility, elasticity and heat sealing property of the unsaturated ester copolymer are not substantially changed, a small amount of another polar monomer such as acrylic acid, methacrylic acid, maleic acid, itaconic acid, maleic anhydride, itaconic anhydride or carbon monoxide may be copolymerized.

Out of these, ethylene/vinyl ester copolymers such as ethylene/vinyl acetate copolymer, and ethylene/unsaturated lower alkyl carboxylate copolymers such as ethylene/methyl (meth)acrylate copolymer, ethylene/ethyl(meth)acrylate copolymer and ethylene/butyl(meth)acrylate copolymer are preferred, and ethylene/vinyl acetate copolymer and ethylene/lower alkyl(meth)acrylate copolymers produced by a tubular reactor polymerization process are particularly preferred.

In the present invention, a copolymer having an unsaturated ester unit content of preferably 3 to 46 wt %, particularly preferably 7 to 33 wt % is used out of the above ethylene/unsaturated ester copolymers (component B). When the unsaturated ester unit content falls within the above range, the compatibility with the propylene-based (co)polymer of the ethylene/unsaturated ester copolymer is satisfactory and the obtained tacky composition has excellent mechanical properties, heat resistance and flexibility.

Further, the ethylene/unsaturated ester copolymer used in the present invention has a melt flow rate (190° C., load of 2160 g; based on JIS K7210-99, 190° C., load of 2160 g) of preferably 1 to 50 g/10 min, particularly preferably 3 to 20 g/10 min from the viewpoints of the adhesive sealing strength and workability of the obtained composition.

The above ethylene/unsaturated ester copolymer can also be obtained by radically copolymerizing ethylene with an unsaturated ester at a high temperature and a high pressure.

For example, a copolymer having high random nature produced by a high-pressure radical polymerization process in an ordinary autoclave may be used. However, in the case of the above ethylene/unsaturated carboxylate copolymer, a copolymer produced in a tubular reactor by a high-pressure radical polymerization process is particularly preferably used.

<Styrene-Based Elastomer and/or Olefin-Based Elastomer (Component C)>

A styrene-based elastomer and/or an olefin-based elastomer (component C) are/is used as still another essential component in the present invention. The styrene-based elastomer is designated as component C-1 and the olefin-based elastomer is designated as component C-2.

The styrene-based elastomer (component C-1) is a block copolymer having a soft segment composed of a diene block (diene polymer) and a hard segment composed of a styrene block (styrene polymer) and a kind of a block copolymer which is produced and marketed as so-called "ethylene-based thermoplastic elastomer". Examples of the styrene-based elastomer include a styrene-butadiene block copolymer (SB), styrene-butadiene-styrene block copolymer (SBS), styrene-isoprene block copolymer (SI), styrene-isoprene-styrene block copolymer (SIS) and hydrogenated products of these block copolymers. The hydrogenated products may be each a block polymer whose styrene block and diene block are both hydrogenated, or a partially hydrogenated product such as a block copolymer obtained by hydrogenating only part of the diene block or a block copolymer obtained by hydrogenating part of the styrene block and part of the diene block.

When one of these block copolymers and hydrogenated products thereof is used in the tacky resin composition, they may be used alone or in combination of two or more.

Out of these block copolymers, hydrogenated products of a block copolymer containing a styrene block and a diene block such as a hydrogenated product of a styrene-butadiene block copolymer (SB), a hydrogenated product of a styrene-butadiene-styrene block copolymer (SBS), a hydrogenated product of a styrene-isobutylene-styrene block copolymer (SIS) and a hydrogenated product of a styrene-isobutylene block copolymer (SI) are more preferred. More specifically, a styrene-ethylene/butene block copolymer (SEB) which is a hydrogenated product of a styrene-butadiene block copolymer (SB), a styrene-ethylene/butene-styrene block copolymer (SEBS) which is a hydrogenated product of a styrene-butadiene-styrene copolymer (SBS), and a styrene-ethylene/propylene-styrene block copolymer (SEPS) which is a hydrogenated product of a styrene-isoprene-styrene block copolymer (SIS) are most preferred because they have excellent heat stability at the time of extrusion molding and stability at the time of processing and suppresses the production of a depleted material and an odor.

MFR (melt flow rate; ASTM D-1238, load of 5 kg, temperature of 200° C.) of the styrene-based elastomer (component C-1) in the present invention is not particularly limited but generally 0.1 to 100 g/10 min, preferably 0.5 to 50 g/10 min.

The olefin-based elastomer is used as the other component C-2 in the present invention. The olefin-based elastomer (component C-2) is an elastomer-like polymer or copolymer comprising one or more olefins as a constituent component(s). More specifically, it is a block copolymer comprising a polyethylene segment and an ethylene/butene copolymer rubber segment, for example, a block copolymer obtained by hydrogenating the butadiene polymerization unit of a block copolymer comprising a polybutadiene segment having a low content of a 1,2-vinyl bond and a polybutadiene segment having a high content of a 1,2-vinyl bond.

That is, as the olefin-based elastomer (component C-2) may be used a block copolymer (may also be referred to as CEBC) comprising a polyethylene segment and an ethylene/butene copolymer rubber segment, for example, a block copolymer obtained by hydrogenating the butadiene polymerization unit of a block copolymer comprising a polybutadiene segment having a low content of a 1,2-vinyl bond and a polybutadiene segment having a high content of a 1,2-vinyl bond.

The olefin-based elastomer (component C-2) is, for example, a block copolymer obtained by hydrogenating not less than 90%, preferably 95 to 100% of the butadiene polymerization unit of a linear or branched block copolymer which comprises a polybutadiene segment (X) having a 1,2-vinyl bond content of not more than 20%, preferably not more than 15% and a polybutadiene segment (Y) having a 1,2-vinyl bond content of 25 to 95%, preferably 25 to 75%, more preferably 25 to 55% and has a block structure represented by X—(Y—X)$_n$ or (X—Y)$_m$ (n is an integer of 1 or more and m is an integer of 2 or more). It is desired that this hydrogenated copolymer should have a melt flow rate at 230° C. under a load of 2160 g of preferably 0.1 to 100 g/10 min, particularly preferably 0.5 to 50 g/10 min.

Examples of the olefin-based elastomer (component C-2) include a crystalline olefin (crystalline ethylene polymer block)-ethylene/butene (amorphous olefin polymer block)-crystalline olefin (crystalline ethylene polymer block) block copolymer (CEBC) and a styrene-ethylene/butene (amorphous olefin polymer block)-crystalline olefin (crystalline ethylene polymer block) block copolymer (SEBC), and DYNARON DR6100P, DR6200P (CEBS), and DR4600P and DR4630P (SEBC) are marketed by JSR Corporation.

Another example of the component C is a propylene homopolymer or a propylene-propylene/α-olefin-propylene block copolymer obtained by living polymerizing a crystalline propylene-based polymer comprising propylene and a small amount of ethylene or propylene and another α-olefin such as 1-butene as the main components to obtain a crystalline olefin polymer and copolymerizing propylene with ethylene or another α-olefin such as 1-butene to obtain an amorphous olefin polymer block.

Still another example of the component C is an amorphous or low-crystalline α-olefin random copolymer having a density of 0.850 to 0.895 g/m$^3$ and a crystallinity measured with X-ray of not more than 40% (0 to 40%) or a composition thereof, for example, an ethylene/α-olefin random copolymer having an ethylene content of 40 to 95 mol %. Examples of the α-olefin include α-olefins having 3 to 12 carbon atoms such as propylene, 1-butene, 1-pentene, 1-hexene and 1-octene. The amorphous or low-crystalline α-olefin random copolymer and the composition thereof are available on the market under the trade names of TAFMER and NOTIO (of Mitsui Chemical Co., Ltd.) and Tafthren (of Sumitomo Chemical Co., Ltd.).

<Tacky Resin Composition>

Preferably, the tacky resin composition of the present invention comprises (A) 5 to 80 parts by weight of the crystalline olefin polymer (component A), (B) 5 to 80 parts by weight of the ethylene/unsaturated ester copolymer (component B) and (C) 1 to 60 parts by weight of the styrene-based elastomer and/or the olefin-based elastomer (component C) based on 100 parts by weight of the total of the components A, B and C.

In the present invention, when the contents of the above components fall within the above ranges, a tacky resin composition which has proper initial tackiness, is further inhibited from rising in tackiness with time, can retain constant appropriate tackiness for a long time and has small dependence on peeling speed is obtained. When the content of the component A is lower than 5 parts by weight based on 100 parts by weight of the total of the components A, B and C, a rise in tackiness with time and dependence on peeling speed become large, and when the content of the component A is higher than 80 parts by weight based on 100 parts by weight of the total of the components A, B and C, initial tackiness becomes low disadvantageously. When the content of the component C is lower than 1 part by weight based on 100 parts by weight of the total of the components A, B and C, a composition having a small rise in tackiness with time is obtained. However, when the content of the component C is not less than 1 part by weight, higher initial tackiness and the effect of suppressing a rise in tackiness with time are obtained, and particularly the effect of suppressing a rise at the time of aging at a high temperature is excellent. When the content of the component C is higher than 60 parts by weight based on 100 parts by weight of the total of the components A, B and C, the workability of the resin composition greatly deteriorates disadvantageously. When importance is attached to the appearance of a film, the content of the elastomer is preferably low since the elastomer produces a relatively large number of fish-eyes (FE).

As for the particularly preferred contents of the components of the composition of the present invention, when the total content of the components A, B and C is 100 parts by weight, (A) the content of the crystalline olefin polymer (component A) is 15 to 75 parts by weight, (B) the content of the ethylene/unsaturated ester copolymer (component B) is 15 to 60 parts by weight, and (C) the content of the styrene-based elastomer and/or the olefin-based elastomer (component C) is 1 to 49 parts by weight.

The tacky resin composition of the present invention may be mixed with a tackifier to improve its initial tackiness. The amount of the tackifier is preferably 0.1 to 30 parts by weight, particularly preferably 0.5 to 20 parts by weight based on 100 parts by weight of the total of the components A, B and C.

Examples of the tackifier to be added to the tacky resin composition include aliphatic, aromatic and aliphatic/aromatic copolymers, alicyclic petroleum-based resins, pinene resin, coumarone indene-based resins, terpene-based resins, terpene phenol-based resins, polymer rhodine-based resins, (alkyl)phenol-based resins and xylene-based resins and hydrogenated resins thereof.

A blend of a tackifier and an olefin resin is available on the market and may be used.

Further, the tacky resin composition may be further mixed with another resin as long as the characteristic properties of the composition are not impaired.

Examples of the another resin include ethylene/unsaturated carboxylic acid copolymer resins which are copolymers of ethylene and an unsaturated carboxylic acid such as (meth) acrylic acid, ethacrynic acid, fumaric acid, maleic acid, monomethyl maleate or maleic anhydride, ethylene/unsaturated carboxylic acid/unsaturated carboxylate copolymer resins such as ethylene/acrylic acid/isobutyl methacrylate copolymer, polyamide resins and polyester resins.

These resins may be used in combination of two or more.

These resins may be added in an amount of 0 to 99 parts by weight, particularly preferably 0 to 49 parts by weight based on 100 parts by weight of the total of the components A, B and C as long as the physical properties of the tacky composition are not impaired.

Further, the tacky resin composition of the present invention may be optionally mixed with appropriate additives such as antioxidant, ultraviolet absorbent, optical stabilizer and pigment.

The tacky resin composition of the present invention is obtained by dry blending or melt blending the above resin components A, B and C and optionally other additives simultaneously or sequentially. Various mixers such as Henschel mixer and tumbler mixer may be used for dry blending, and kneading machines such as single-screw or double-screw extruder, Banbury mixer, roll and kneader may be used for melt blending to melt knead the above components at a temperature of about 140 to 230° C.

The tacky resin composition obtained in the present invention has an initial tackiness of preferably 0.5 to 500 g/25 mm which is generally required, particularly preferably 1 to 350 g/mm and a tackiness increase rate of preferably not more than 50%, more preferably not more than 30%. The tacky resin composition can obtain stable tackiness (adhesive force) for a long time.

<Pressure-Sensitive Adhesive Film or Sheet>

A description is subsequently given of a pressure-sensitive adhesive film or sheet obtained from the above tacky resin composition of the present invention.

In the present invention, the pressure-sensitive adhesive film or sheet may be used as a single-layer film or sheet obtained by molding the above tacky resin composition. In general, it is preferably a multi-layer film or sheet comprising a pressure-sensitive adhesive layer formed from the resin composition on at least one side (that is, one side or both sides) of a base layer.

Although a base material forming the base layer is not particularly limited, a stretched or unstretched thermoplastic resin film or sheet comprising one or more of a polyester, polyamide, propylene-based polymers such as polypropylene or block or random propylene copolymer containing ethylene component as a comonomer, ethylene-based polymers such as low-density polyethylene, high-density polyethylene and linear low-density or super low-density polyethylene, and olefin-based polymers such as ethylene/propylene copolymer, paper, metal foil or nonwoven cloth may be used as the base material. Out of these base materials, a polypropylene-based polymer or polyethylene-based polymer film is particularly preferred from the viewpoints of workability, transparency, film toughness and cost.

When a thermoplastic film is used as the base material, suitable additives such as an antioxidant, ultraviolet absorbent, optical stabilizer such as hindered amine optical stabilizer, antistatic agent and others including carbon black, calcium oxide, magnesium oxide, silica, zinc oxide or titanium oxide filler or pigment may be used.

The thickness of the base layer is about 1 to 200 μm, preferably 10 to 100 μm. However, the thickness is not limited to this range.

A pressure-sensitive adhesive layer can be formed by a conventionally known pressure-sensitive adhesive sheet production method, for example, a solution coating method in which a solution or heat molten liquid prepared by dissolving an adhesive in a solvent is applied to a base material, a method in which a pressure-sensitive adhesive layer formed by applying the above solution to a separator base material is transferred, a hot melt coating method in which a pressure-sensitive adhesive layer forming material is extruded and formed on a supporting base material, a method in which a base material and a pressure-sensitive adhesive layer are co-extruded into two layers or three or more layers to form a multi-layer film, a method in which a pressure-sensitive adhesive layer is extruded onto a base material as a single layer and laminated with the base material, a method in which an adhesive layer and a pressure-sensitive adhesive layer are extruded and laminated together, or a method in which a pressure-sensitive adhesive layer and a supporting base forming material such as a film or laminated layer are thermally laminated together.

Out of these production methods, preferred is a method in which a pressure-sensitive adhesive layer is co-extruded and molded together with a base layer made of a thermoplastic resin to form two layers or three or more layers by an inflation process or T die process.

The thickness of the formed pressure-sensitive adhesive layer which is suitably determined according to adhesive force is generally 1 to 200 μm, preferably 5 to 100 μm.

The pressure-sensitive adhesive film or sheet of the present invention is mainly used for the surface protection of a synthetic resin board, a decorative laminate, metal sheet or a coated steel sheet, for the surface protection of a windowpane, for surface protection when an automobile is finished by baking or a printed circuit board is immersed in solder and further for the surface protection of precision electronic parts such as a liquid crystal panel board, reflecting plate, phase difference plate, prism sheet, light guiding plate, polarizing plate, plasma display panel board, organic fluorescent thin film and transparent electrode, all of which are constituent members of a plasma display or an organic thin film EL apparatus.

EXAMPLES

The following examples are provided for the purpose of further illustrating the present invention but are in no way to be taken as limiting.

1. Composition Raw Material Resins (A1): propylene-based copolymer (A1): crystalline random copolymerization propylene resin having an mp of 139° C., a latent heat quantity (heat absorption quantity) obtained from a DSC measurement heat absorption peak (based on JIS K7122) of 86 J/g, and an MFR (230° C.) of 7.3 g/10 min under the trade name of Prime Polypro F327 (of Prime Polymer Co., Ltd.)

(A2): ethylene-based copolymer (A2): linear low-density polyethylene having a density of 924 kg/m$^3$ and an MFR of 3.8 g/10 min under the trade name of EVOLUE SP2540 (of Prime Polymer Co., Ltd.)

(A3): ethylene-based copolymer (A3): linear low-density polyethylene having a density of 902 kg/m$^3$ and an MFR of 3 g/10 min under the trade name of AFFINITY PL1850G (of Dow Chemical Co., Ltd.)

(B) ethylene/vinyl acetate copolymer (B1) having a vinyl acetate content of 24 wt % (JIS K7192-1999) and an MFR of 4 g/10 min (JIS K7210-1999, 190° C., load of 2.16 kg) ethylene/vinyl acetate copolymer (B2) having a vinyl acetate content of 10 wt % (JIS K7192-1999) and an MFR of 9 g/10 min (JIS K7210-1999, 190° C., load of 2.16 kg)

(C1) hydrogenated product (SEPS) of styrene-isoprene-styrene block copolymer (SIS) having a styrene content of 13 wt % and an MFR (230° C.) of 7 g/10 min under the trade name of SEPTON 52063 (of Kuraray Co., Ltd.)

(C2) hydrogenated product (SEBS) of styrene-butadiene-styrene block copolymer (SBS) having a styrene content of 29 wt % and an MFR (230° C.) of 1 g/10 min under the trade name of SEPTON 58007 (of Kuraray Co., Ltd.)

(C3) CEBC (ethylene-ethylene/butylene-ethylene block copolymer) under the trade name of DYNARON 6200P (of JSR Corporation)

(D) Tackifier: ALCON AM1 (hydrogenated aromatic hydrocarbon resin: softening point measured by a spherical ball method of 115° C. and manufactured by Arakawa Kagaku Co., Ltd. (to be referred to as "tackifier AM-1" hereinafter)

2. Evaluation Items and Methods adhesion

Adhesion to Acrylic Board

A sample film of a tacky composition and an acrylic board were pressure bonded together by reciprocating a 2 kg manual roll twice, and the initial tackiness, age tackiness and an increase in the tackiness of the resulting laminate were evaluated as follows by stripping at 180° and a take-up rate of 300 mm/min in accordance with JIS Z0237.

initial tackiness; The laminated test board was measured after it was left in a thermo-hygrostat (23°×50% RH) for 30 minutes.

age tackiness (tackiness after aging)

The test sample prepared for the evaluation of tackiness was put in an oven and aged at the following predetermined temperature for the following predetermined time. After the sample taken out from the oven was left in a thermo-hygrostat (23°×50% RH) for 30 minutes, its tackiness was measured.

Aging condition-1: oven temperature of 40° C.×24 h
Aging condition-2: oven temperature of 60° C.×3 h
Aging condition-3: oven temperature of 70° C.×3 h
Aging condition-4: oven temperature of 80° C.×3 h
Aging condition-5: oven temperature of 60° C.×24 h increase in tackiness increase rate (%)=[age tackiness−initial tackiness]/initial tackiness]×100

Example 1

52.2 parts by weight of a propylene-based copolymer (A1), 37.8 parts by weight of an ethylene/vinyl acetate copolymer (B1) and 10 parts by weight of a styrene-based elastomer (C1; SEPS) were melt kneaded together by means of a 65 mm-diameter single-screw extruder at 200° C. to obtain a tacky resin composition.

This resin composition was extruded onto a polyethylene terephthalate (PET) release film by using an extrusion cast molding machine (65 mm in diameter) and cut into a film having a predetermined size, and the release film was removed to obtain a sample film (total thickness of 90 μm).

The above properties of this sample film were evaluated. The evaluation results are shown in Table 1.

Example 2

57 parts by weight of a propylene-based copolymer (A1), 38 parts by weight of an ethylene/vinyl acetate copolymer (B1) and 5 parts by weight of a styrene-based elastomer (C2: SEBS) were melt kneaded together by means of the same apparatus under the same conditions as in Example 1 to obtain a tacky resin composition.

This resin composition was extrusion molded and cut into a film having a predetermined size to obtain a sample film (thickness of 90 μm).

The above properties of this sample film were evaluated in the same manner as in Example 1.

The results are shown in Table 1.

Example 3

57 parts by weight of a propylene-based copolymer (A1), 38 parts by weight of an ethylene/vinyl acetate copolymer (B1) and 5 parts by weight of a styrene-based elastomer (C1: SEPS) were melt kneaded together by means of the same apparatus under the same conditions as in Example 1 to obtain a tacky resin composition. This resin composition was extrusion molded and cut into a film having a predetermined size to obtain a sample film (thickness of 90 μm).

The above properties of this sample film were evaluated in the same manner as in Example 1.

The results are shown in Table 1.

Since the obtained sample film had little gel such as fish-eyes (FE) and high transparency when it was observed with the eye, its optical properties (haze based on JIS K7136, total light transmittance based on JIS K7361) were measured.

As a result, it was found that it had excellent transparency with a haze of 1.3% and a total light transmittance of 94.3%.

Example 4

57 parts by weight of a propylene-based copolymer (A1), 38 parts by weight of an ethylene/vinyl acetate copolymer (B1) and 5 parts by weight of an olefin-based elastomer (C3: CEBC) were melt kneaded together by means of the same apparatus under the same conditions as in Example 1 to obtain a tacky resin composition. This resin composition was extrusion molded and cut into a film having a predetermined size to obtain a sample film (thickness of 90 μm).

The above properties of this sample film were evaluated in the same manner as in Example 1.

The results are shown in Table 1.

Comparative Example 1

An ethylene/vinyl acetate copolymer (B2) was extruded by means of an extrusion cast molding machine and cut into a film having a predetermined size to obtain a sample film (thickness of 90 μm).

The above properties of this sample film were evaluated in the same manner as in Example 1.
The results are shown in Table 1.

Comparative Example 2

97.5 parts by weight of a styrene-based elastomer (C1; SEPS) and 2.5 parts by weight of a tackifier (AM-1) were mixed together and melt kneaded together by means of the same apparatus under the same conditions as in Example 1 to obtain a tacky resin composition.
This resin composition was extrusion molded by using an extrusion cast molding machine and cut into a film having a predetermined size to obtain a sample film (thickness of 90 μm).
The above properties of this sample film were evaluated in the same manner as in Example 1.
The results are shown in Table 1.

TABLE 1

| | Exammple (Comp. Example) | | | | | |
|---|---|---|---|---|---|---|
| | Ex. 1 | Ex. 2 | Ex. 3 | Ex. 4 | Comp. Ex. 1 | Comp. Ex. 2 |
| initial tackiness (g/25 mm) | 2.6 | 1.5 | 2.8 | 3 | 8.2 | 3.6 |
| age tackiness (g/25 mm) (aging condition-1) | 2.7 | 1.7 | 3 | 2.6 | 15 | 6.9 |
| increase rate (%) | 4 | 13 | 7 | −13 | 83 | 92 |
| age tackiness (g/25 mm) (aging condition-2) | 3.0 | 2.0 | 3.1 | 2.9 | 21 | 8.7 |
| increase rate (%) | 15 | 33 | 11 | −3 | 156 | 142 |

Example 5

52.2 parts by weight of a propylene-based copolymer (A1), 37.8 parts by weight of an ethylene/vinyl acetate copolymer (B1), 10 parts by weight of a styrene-based elastomer (C1: SEPS) and 3 parts by weight of a tackifier (AM-1) were melt kneaded together by means of the same apparatus under the same conditions as in Example 1 to obtain a tacky resin composition.
This resin composition was extrusion molded and cut into a film having a predetermined size to obtain a sample film (thickness of 90 μm).
The above properties of this sample film were evaluated in the same manner as in Example 1.
The results are shown in Table 2.

Example 6

46.4 parts by weight of a propylene-based copolymer (A1), 33.6 parts by weight of an ethylene/vinyl acetate copolymer (B1), 20 parts by weight of a styrene-based elastomer (C1: SEPS) and 3 parts by weight of a tackifier (AM-1) were melt kneaded together by means of the same apparatus under the same conditions as in Example 1 to obtain a tacky resin composition.
This resin composition was extrusion molded and cut into a film having a predetermined size to obtain a sample film (thickness of 90 μm).
The above properties of this sample film were evaluated in the same manner as in Example 1.
The results are shown in Table 2.

Example 7

38 parts by weight of a propylene-based copolymer (A1), 42 parts by weight of an ethylene/vinyl acetate copolymer (B1), 20 parts by weight of a styrene-based elastomer (C1: SEPS) and 3 parts by weight of a tackifier (AM-1) were melt kneaded together by means of the same apparatus under the same conditions as in Example 1 to obtain a tacky resin composition.
This resin composition was extrusion molded and cut into a film having a predetermined size to obtain a sample film (thickness of 90 μm).
The above properties of this sample film were evaluated in the same manner as in Example 1.
The results are shown in Table 2.

TABLE 2

| | Exammple (Comp. Example) | | |
|---|---|---|---|
| | Ex. 5 | Ex. 6 | Ex. 7 |
| initial tackiness (g/25 mm) | 4.9 | 10 | 16 |
| age tackiness (g/25 mm) (aging condition-1) | 5.2 | 11 | 17 |
| increase rate (%) | 6 | 10 | 6 |
| age tackiness (g/25 mm) (aging condition-2) | 5.5 | 10 | 16 |
| increase rate (%) | 12 | 0 | 0 |
| age tackiness (g/25 mm) (aging condition-3) | 5.8 | 10 | 16 |
| increase rate (%) | 18 | 0 | 0 |
| age tackiness (g/25 mm) (aging condition-4) | 6.1 | 10 | 15 |
| increase rate (%) | 24 | 0 | −6 |

Example 8

20 parts by weight of a propylene-based copolymer (A1), 60 parts by weight of an ethylene/vinyl acetate copolymer (B1), 20 parts by weight of a styrene-based elastomer (C1: SEPS) and 10 parts by weight of a tackifier (AM-1) were melt kneaded together by means of the same apparatus under the same conditions as in Example 1 to obtain a tacky resin composition.
This resin composition was extrusion molded and cut into a film having a predetermined size to obtain a sample film (thickness of 90 μm).
The above properties of this sample film were evaluated in the same manner as in Example 1.
The results are shown in Table 3.

Example 9

30 parts by weight of a propylene-based copolymer (A1), 60 parts by weight of an ethylene/vinyl acetate copolymer (B1), 10 parts by weight of a styrene-based elastomer (C1: SEPS) and 10 parts by weight of a tackifier (AM-1) were melt kneaded together by means of the same apparatus under the same conditions as in Example 1 to obtain a tacky resin composition.
This resin composition was extrusion molded and cut into a film having a predetermined size to obtain a sample film (thickness of 90 μm).
The above properties of this sample film were evaluated in the same manner as in Example 1.
The results are shown in Table 3.

Comparative Example 3

50 parts by weight of a propylene-based copolymer (A1), 50 parts by weight of a styrene-based elastomer (C1: SEPS)

and 10 parts by weight of a tackifier (AM-1) were melt kneaded together by means of the same apparatus under the same conditions as in Example 1 to obtain a tacky resin composition.

This resin composition was extrusion molded and cut into a film having a predetermined size to obtain a sample film (thickness of 90 μm).

The above properties of this sample film were evaluated in the same manner as in Example 1.

The results are shown in Table 3.

TABLE 3

|  | Exammple (Comp. Example) | | |
| --- | --- | --- | --- |
|  | Ex. 8 | Ex. 9 | Comp. Ex. 3 |
| initial tackiness (g/25 mm) | 280 | 85 | 77 |
| age tackiness (g/25 mm) (aging condition-1) | 310 | 86 | 164 |
| increase rate (%) | 11 | 1 | 113 |
| age tackiness (g/25 mm) (aging condition-2) | 280 | 79 | 131 |
| increase rate (%) | 0 | −7 | 70 |

Example 10

38 parts by weight of a propylene-based copolymer (A1), 42 parts by weight of an ethylene/vinyl acetate copolymer (B1), 20 parts by weight of a styrene-based elastomer (C1: SEPS) and 3 parts by weight of a tackifier (AM-1) were melt kneaded together by means of a 65 mm-diameter single-screw extruder at 200° C. to obtain a tacky resin composition.

This resin composition was extruded by using an extrusion cast molding machine (65 mm in diameter) and cut into a film having a predetermined size to obtain a sample film (thickness of 90 μm). The 180° adhesion/peel strength (initial tackiness) of this sample film to an acrylic board was measured at take-up rates of 300 mm/min and 2100 mm/min. As a result, the adhesion/peel strength was 16 g/25 mm at a take-up rate of 300 mm/min and 19 g/25 mm at a take-up rate of 2100 mm/min.

Example 11

46.4 parts by weight of a propylene-based copolymer (A1), 33.6 parts by weight of an ethylene/vinyl acetate copolymer (B1), 20 parts by weight of a styrene-based elastomer (C1: SEPS) and 3 parts by weight of a tackifier (AM-1) were melt kneaded together by means of a 65 mm-diameter single-screw extruder at 200° C. to obtain a tacky resin composition.

This resin composition was extruded by using an extrusion cast molding machine (65 mm in diameter) and cut into a film having a predetermined size to obtain a sample film (thickness of 90 μm).

The 180° adhesion/peel strength (initial tackiness) of this sample film to an acrylic board was measured at take-up rates of 300 mm/min and 2100 mm/min. As a result, the adhesion/peel strength was 10 g/25 mm at a take-up rate of 300 mm/min and 14 g/25 mm at a take-up rate of 2100 mm/min.

The composition was hardly affected by the peeling speed and had stable adhesion/peel strength.

Comparative Example 4

90 parts by weight of an ethylene/vinyl acetate copolymer (B2) and 10 parts by weight of a master batch (diluted resin; ethylene/vinyl acetate copolymer having a vinyl acetate content of 14 wt %) containing 13 wt % of ALKON M90 (alicyclic saturated hydrocarbon resin having a softening point measured by a ring sphere method of 90° C., manufactured by Arakawa Kagaku Co., Ltd.) as a tackifier were melt kneaded together by means of a 65 mm-diameter single-screw extruder at 200° C. to obtain a tacky resin composition.

This resin composition was extruded by using an extrusion cast molding machine (65 mm in diameter) and cut into a film having a predetermined sized to obtain a sample film (thickness of 90 μm).

The 180° adhesion/peel strength (initial tackiness) of this sample film to an acrylic board was measured at take-up rates of 300 mm/min and 2100 mm/min. As a result, the adhesion/peel strength was 11 g/25 mm at a take-up rate of 300 mm/min and 41 g/25 mm at a take-up rate of 2100 mm/min. Thus, when the peeling speed increased, the adhesion/peel strength rose drastically.

Comparative Example 5

An ethylene/vinyl acetate copolymer [vinyl acetate content of 10 wt % (JIS K7192-1999), MFR of 3 g/10 min (JIS K7210-1999, 190° C., load of 2.16 kg)] was extruded by using an extrusion cast molding machine (65 mm in diameter) and cut into a film having a predetermined size to obtain a sample film (thickness of 90 μm).

The 180° adhesion/peel strength (initial tackiness) of this sample film to an acrylic board was measured at take-up rates of 300 mm/min and 2100 mm/min. As a result, the adhesion/peel strength was 5.3 g/25 mm at a take-up rate of 300 mm/min and 16 g/25 mm at a take-up rate of 2100 mm/min. Thus, when the peeling speed increased, the adhesion/peel strength rose drastically.

Example 12

20 parts by weight of a propylene-based copolymer (A1), 60 parts by weight of an ethylene/vinyl acetate copolymer (B1) and 20 parts by weight of a styrene-based elastomer (C1: SEPS) were melt kneaded together by means of the same apparatus under the same conditions as in Example 1 to obtain a tacky resin composition.

Low-density polyethylene (LDPE; MIRASON 16SPO of Prime Polymer Co., Ltd.) and the above composition were extrusion molded into a base layer and a pressure-sensitive adhesive layer, respectively, by using a multi-layer extrusion cast molding machine (40 mm in diameter×3), and the resulting laminate was cut into a film having a predetermined size to obtain a sample film (film constitution: LDPE/LDPE/tacky resin composition=20/20/20 μm, total thickness of 60 μm).

The above properties of this sample film were evaluated in the same manner as in Example 1.

The results are shown in Table 4.

Example 13

30 parts by weight of a propylene-based copolymer (A1), 30 parts by weight of an ethylene/vinyl acetate copolymer (B1) and 40 parts by weight of a styrene-based elastomer (C1: SEPS) were melt kneaded together by means of the same apparatus under the same conditions as in Example 1 to obtain a tacky resin composition.

Low-density polyethylene (LDPE; MIRASON 16SPO of Prime Polymer Co., Ltd.) and the above composition were extrusion molded into a base layer and a pressure-sensitive adhesive layer, respectively, by using a multi-layer extrusion cast molding machine (40 mm in diameter×3), and the resulting laminate was cut into a film having a predetermined size to obtain a sample film (film constitution: LDPE/LDPE/tacky resin composition=20/20/20 μm, total thickness of 60 μm).

The above properties of this sample film were evaluated in the same manner as in Example 1.

The results are shown in Table 4.

Comparative Example 6

Low-density polyethylene (LDPE; MIRASON 16SPO of Prime Polymer Co., Ltd.) was extrusion molded into a base layer, an ethylene/vinyl acetate copolymer (B2) was extrusion molded into a pressure-sensitive adhesive layer in place of the tacky resin composition used in Example 12 by using a multi-layer extrusion cast molding machine (40 mm in diameter×3), and the resulting laminate was cut into a film having a predetermined size to obtain a sample film (film constitution: LDPE/LDPE/tacky resin composition=20/20/20 μm, total thickness of 60 μm).

The above properties of this sample film were evaluated in the same manner as in Example 1.

The results are shown in Table 4.

TABLE 4

|  | Exammple (Comp. Example) | | |
| --- | --- | --- | --- |
|  | Ex. 12 | Ex. 13 | Comp. Ex. 6 |
| initial tackiness (g/25 mm) | 47 | 24 | 11 |
| age tackiness (g/25 mm) (aging condition-5) | 54 | 20 | 34 |
| increase rate (%) | 15 | −17 | 209 |

Example 14

45 parts by weight of a polyethylene-based copolymer (A2), 45 parts by weight of an ethylene/vinyl acetate copolymer (B1) and 10 parts by weight of a styrene-based elastomer (C1: SEPS) were melt kneaded together by means of the same apparatus under the same conditions as in Example 1 to obtain a tacky resin composition.

Low-density polyethylene (LDPE; MIRASON 16SPO of Prime Polymer Co., Ltd.) and the above composition were extrusion molded into a base layer and a pressure-sensitive adhesive layer, respectively, by using a multi-layer extrusion cast molding machine (40 mm in diameter×3), and the resulting laminate was cut into a film having a predetermined size to obtain a sample film (film constitution: LDPE/LDPE/tacky resin composition=20/20/20 μm, total thickness of 60 μm).

The above properties of this sample film were evaluated in the same manner as in Example 1.

The results are shown in Table 5.

Example 15

40 parts by weight of an ethylene-based copolymer (A3), 40 parts by weight of an ethylene/vinyl acetate copolymer (B1) and 20 parts by weight of a styrene-based elastomer (C1: SEPS) were melt kneaded together by means of the same apparatus under the same conditions as in Example 1 to obtain a tacky resin composition.

Low-density polyethylene (LDPE; MIRASON 16SPO of Prime Polymer Co., Ltd.) and the above composition were extrusion molded into a base layer and a pressure-sensitive adhesive layer, respectively, by using a multi-layer extrusion cast molding machine (40 mm in diameter×3), and the resulting laminate was cut into a film having a predetermined size to obtain a sample film (film constitution: LDPE/LDPE/tacky resin composition=20/20/20 μm, total thickness of 60 μm).

The above properties of this sample film were evaluated in the same manner as in Example 1.

The results are shown in Table 5.

TABLE 5

|  | Exammple (Comp. Example) | |
| --- | --- | --- |
|  | Ex. 14 | Ex. 15 |
| initial tackiness (g/25 mm) | 13 | 46 |
| age tackiness (g/25 mm) (aging condition-2) | 15 | 50 |
| increase rate (%) | 15 | 9 |

The invention claimed is:

1. A tacky resin composition consisting of:
(A) 15 to 75 parts by weight of an only one olefin polymer (component A) selected from a group consisting of low-density polyethylene, high-density polyethylene, polypropylene random copolymer, and isotactic polypropylene,
(B) 15 to 60 parts by weight of an ethylene/unsaturated ester copolymer (component B),
(C) 1 to 49 parts by weight of a styrene-based elastomer and/or an olefin-based elastomer (component C),
optionally 0.5 to 20 parts by weight of a tackifier, based on 100 parts by weight of the total of the components A, B and C, the tackifier being selected from a group consisting of ethylene/unsaturated carboxylic acid copolymer resins, ethylene/unsaturated carboxylic acid/unsaturated carboxylate copolymer resins, and polyester resins, and
optionally an antioxidant, ultraviolet absorbent, optical stabilizer, pigment, or combinations thereof.

2. The tacky resin composition according to claim 1, wherein (A) the content of the olefin polymer (component A) is 30 to 75 parts by weight, (B) the content of the ethylene/unsaturated ester copolymer (component B) is 30 to 60 parts by weight, (C) the content of the styrene-based elastomer and/or the olefin-based elastomer (component C) is 1 to 49 parts by weight based on 100 parts by weight of the total of the components A, B and C.

3. The tacky resin composition according to claim 1, wherein the component A is a propylene-based (co)polymer having a melting point of 130° C. or higher.

4. The tacky resin composition according to claim 1, wherein the polypropylene random copolymer comprises not less than 50 mol % a propylene component and less than 50 mol % of α-olefins having 2 or 4 to 20 carbon atoms.

5. The tacky resin composition according to claim 1, wherein the styrene-based elastomer is a styrene-ethylene/butene-styrene block copolymer (SEBS) which is a hydrogenated product of a styrene-butadiene-styrene block copolymer (SBS) or a styrene-ethylene/propylene-styrene block copolymer (SEPS) which is a hydrogenated product of a styrene-isoprene-styrene block copolymer (SIS).

6. The tacky resin composition according to claim 1 which consists of 0.5 to 20 parts by weight of the tackifier.

7. A pressure-sensitive adhesive film or sheet comprising a pressure-sensitive adhesive layer formed from the tacky resin composition of claim 1.

8. A pressure-sensitive adhesive film or sheet which comprises a pressure-sensitive adhesive layer formed from the tacky resin composition of claim 1.

9. A pressure-sensitive adhesive film or sheet having a pressure-sensitive adhesive layer formed from the tacky resin composition of claim 1 on at least one side of a base layer.

10. The pressure-sensitive adhesive film or sheet according to claim 9, wherein the base layer is a film or sheet made of an ethylene-based polymer or a propylene-based polymer.

11. A surface protection film or sheet which is the film or sheet of claim 9.

12. A method of protecting a surface of an article, comprising:
attaching the pressure-sensitive adhesive film or sheet of claim 7 onto the surface of an article.

13. A tacky resin composition consisting of:
7.5 to 75 parts by weight of an only one olefin polymer (component A) selected from a group consisting of low-density polyethylene, high-density polyethylene, polypropylene random copolymer, and isotactic polypropylene,
7.5 to 75 parts by weight of an ethylene/unsaturated ester copolymer (component B),
1 to 49 parts by weight of a styrene-based elastomer and/or an olefin-based elastomer (component C),
optionally 0.5 to 20 parts by weight of a tackifier based on 100 parts by weight of the total of the components A, B and C, the tackifier being selected from a group consisting of ethylene/unsaturated carboxylic acid copolymer resins, ethylene/unsaturated carboxylic acid/unsaturated carboxylate copolymer resins, and polyester resins, and
optionally an antioxidant, ultraviolet absorbent, optical stabilizer, pigment, or combinations thereof.

14. The tacky resin composition of claim 13, wherein the composition consists of 30 to 75 parts by weight of the olefin polymer (component A), 30 to 60 parts by weight of the ethylene/unsaturated ester copolymer (component B), 1 to 49 parts by weight of the styrene-based elastomer and/or the olefin-based elastomer (component C), and optionally an antioxidant, ultraviolet absorbent, optical stabilizer, pigment, or combinations thereof.

15. The tacky resin composition of claim 13, wherein the composition consists of 15 to 75 parts by weight of the isotactic olefin polymer (component A), 15 to 60 parts by weight of the ethylene/unsaturated ester copolymer (component B), and 1 to 49 parts by weight of the styrene-based elastomer and/or the olefin-based elastomer (component C).

16. The tacky resin composition of claim 13, wherein the composition consists of 15 to 75 parts by weight of the isotactic olefin polymer (component A), 15 to 60 parts by weight of the ethylene/unsaturated ester copolymer (component B), and 1 to 49 parts by weight of the olefin-based elastomer (component C).

17. The tacky resin composition of claim 13, wherein the composition consists of 15 to 75 parts by weight of the olefin polymer (component A), 15 to 60 parts by weight of the ethylene/unsaturated ester copolymer (component B), and 1 to 49 parts by weight of a crystalline olefin-amorphous olefin-crystalline olefin block copolymer (component C).

18. The tacky resin composition of claim 13, wherein the composition consists of 15 to 75 parts by weight of the olefin polymer (component A), 15 to 60 parts by weight of the ethylene/unsaturated ester copolymer (component B), and 1 to 49 parts by weight of a crystalline ethylene-amorphous ethylene/butene-crystalline ethylene block copolymer (component C).

19. The tacky resin composition of claim 13, wherein the composition consists of 15 to 75 parts by weight of the olefin polymer (component A), 15 to 60 parts by weight of the ethylene/unsaturated ester copolymer (component B), and 1 to 49 parts by weight of a styrene-ethylene/propylene-styrene block copolymer and/or a styrene-ethylene/butene-styrene block copolymer (component C).

20. The tacky resin composition of claim 13, wherein the composition consists of 30 to 75 parts by weight of the olefin polymer (component A), 30 to 60 parts by weight of the ethylene/unsaturated ester copolymer (component B), and 1 to 49 parts by weight of the styrene-based elastomer and/or the olefin-based elastomer (component C).

* * * * *